(12) United States Patent
Yuuki

(10) Patent No.: US 7,681,191 B2
(45) Date of Patent: Mar. 16, 2010

(54) FIRMWARE VERSION MANAGING METHOD OF COMPUTER SYSTEM AND INFORMATION PROCESSING DEVICE

(75) Inventor: Kazuhiro Yuuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1203 days.

(21) Appl. No.: 11/237,709

(22) Filed: Sep. 29, 2005

(65) Prior Publication Data

US 2006/0225069 A1     Oct. 5, 2006

(30) Foreign Application Priority Data

Mar. 18, 2005  (JP) ............................. 2005-078506

(51) Int. Cl.
*G06F 9/44* (2006.01)
(52) U.S. Cl. .................. 717/170; 717/122; 717/168; 717/174; 713/192; 710/302
(58) Field of Classification Search ......... 717/168–178; 713/1, 100, 192; 710/302
See application file for complete search history.

(56) References Cited

U.S. PATENT DOCUMENTS

| | | | |
|---|---|---|---|
| 5,901,320 A | | 5/1999 | Takahashi et al. |
| 6,725,317 B1 * | | 4/2004 | Bouchier et al. ............ 710/312 |
| 2002/0016891 A1 * | | 2/2002 | Noel et al. .................. 711/153 |
| 2002/0124166 A1 | | 9/2002 | Lee et al. |
| 2002/0165962 A1 | | 11/2002 | Alvarez et al. |
| 2003/0033512 A1 | | 2/2003 | Austen et al. |
| 2003/0106052 A1 * | | 6/2003 | Morrison et al. ............ 717/170 |
| 2003/0140134 A1 * | | 7/2003 | Swanson et al. ............ 709/223 |
| 2003/0233493 A1 | | 12/2003 | Boldon et al. |
| 2004/0139308 A1 | | 7/2004 | Foster et al. |
| 2004/0255286 A1 | | 12/2004 | Rothman et al. |
| 2008/0270677 A1 * | | 10/2008 | Kolakowski ................. 711/103 |

FOREIGN PATENT DOCUMENTS

| | | |
|---|---|---|
| JP | A-2002-358209 | 12/2002 |
| JP | A-2004-21463 | 1/2004 |

OTHER PUBLICATIONS

European Search Report for Application No. 05253488.0-2211 mailed Jul. 7, 2006.

* cited by examiner

*Primary Examiner*—Wei Y Zhen
*Assistant Examiner*—Satish Rampuria
(74) *Attorney, Agent, or Firm*—Fujitsu Patent Center

(57) ABSTRACT

Automated update to the firmware of the optimum version can be performed when a system board is exchanged, etc. When a system board is exchanged, a version change unit compares the version of the firmware of the system board with the version of the firmware of the corresponding partition stored in the partition-specific version storage unit. When they do not match, the version of the firmware of the system board is updated to the same version stored in the partition-specific version storage unit.

6 Claims, 9 Drawing Sheets

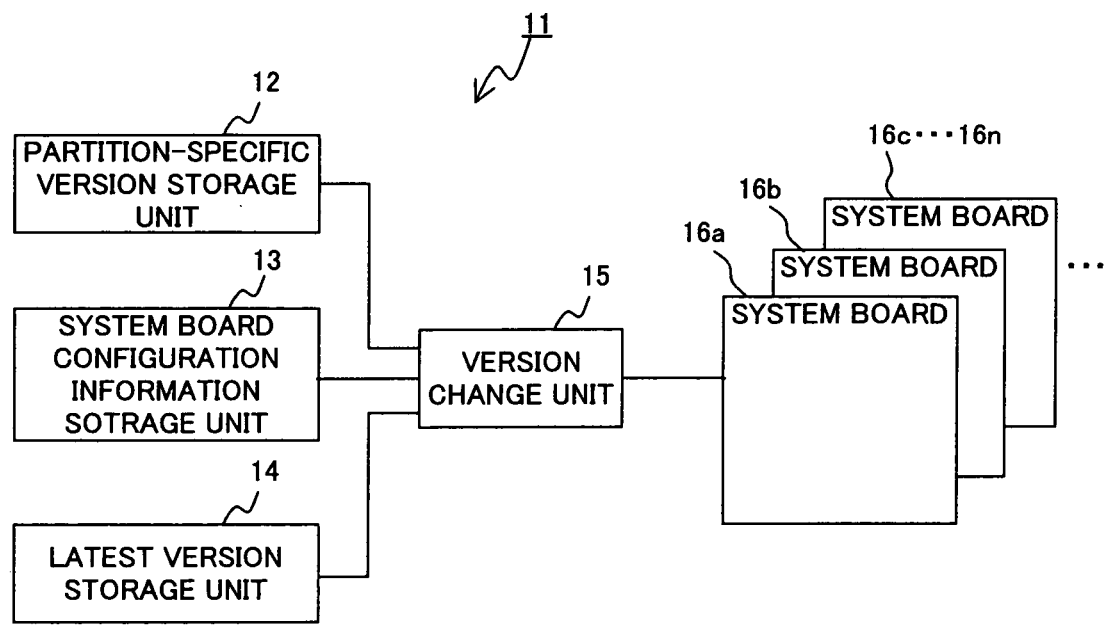
F I G. 1

41

| PARTITION NUMBER | CURRENT VERSION NUMBER | VERSION BANK NUMBER | | CURRENT BANK NUMBER | PREVIOUS VERSION NUMBER |
|---|---|---|---|---|---|
| | | BANK 0 | BANK 1 | | |
| 0 | A | A | A | 1 | - |
| 1 | B | A | B | 1 | A |
| 2 | C | A | C | 1 | A |
| 3 | D | A | D | 1 | A |
| 4 | E | E | D | 0 | D |
| ⋮ | | | | | |
| n | E | D | E | 1 | D |

F I G. 3 A

42

| SB NUMBER | PARTITION NUMBER | PORT SERIAL NUMBER |
|---|---|---|
| 0 | 0 | 1111111 |
| 1 | 0 | 2222222 |
| 2 | 1 | 3333333 |
| 3 | 2 | 44444444 |
| 4 | 3 | 5555555 |
| 5 | 4 | 6666666 |
| 6 | n | 7777777 |

F I G. 3 B

43

| VERSION NUMBER INFORMATION | Valid | FIRM INFORMATION |
|---|---|---|
| A0 | × | obpfile_0001 |
| A | ○ | obpfile_0002 |
| D | ○ | obpfile_0005 |
| E | ○ | obpfile_0006 |

F I G. 3 C

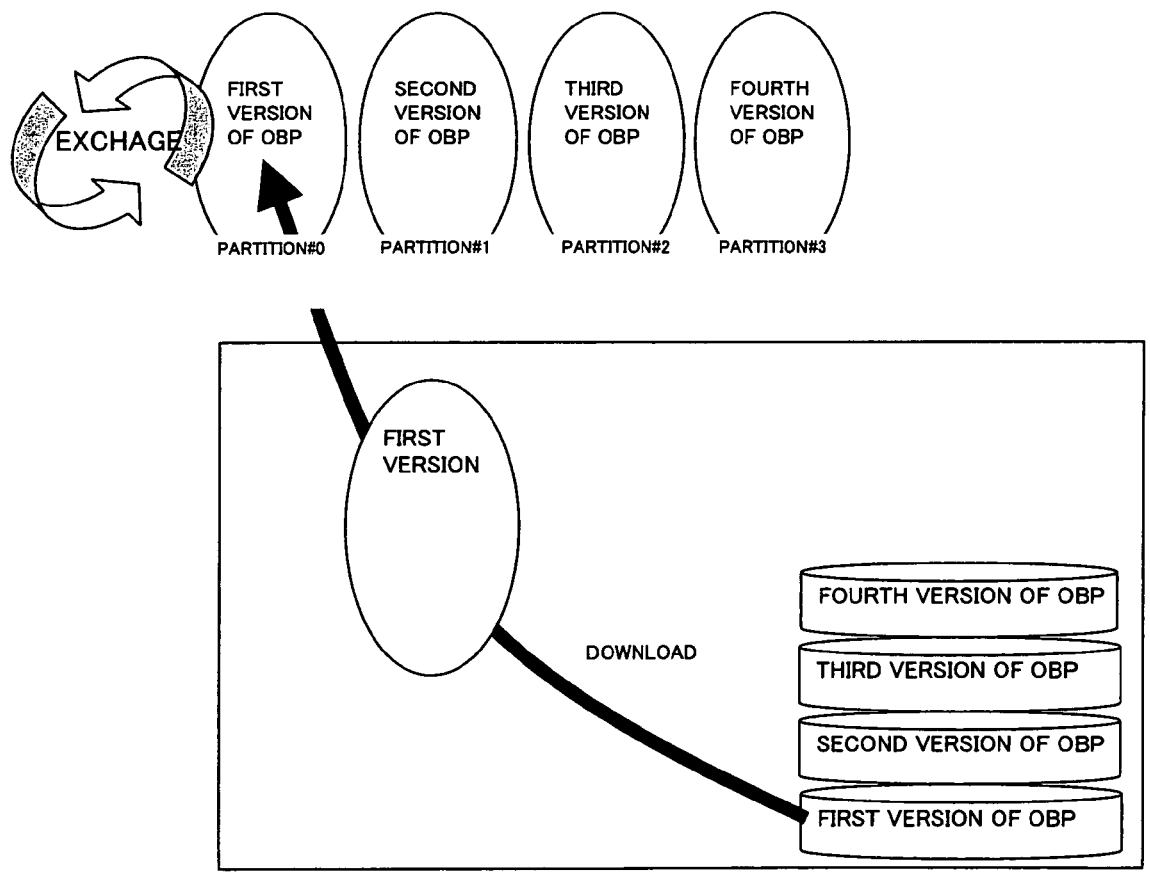
F I G. 5

FIRMWARE VERSION MANAGING METHOD OF COMPUTER SYSTEM AND INFORMATION PROCESSING DEVICE

BACKGROUND OF THE INVENTION

1. Field of the Invention

The present invention relates to a firmware version managing method of a computer system having a plurality of partitions in which a plurality of operation systems can be operated, and an information processing device having a plurality of partitions in which a plurality of operation systems can be operated.

2. Description of the Related Art

With a computer system for basic operations, it is essential to exchange hardware and load new firmware in an active state.

A method for changing the function of a computer system can be two methods, that is, exchanging a system board and loading new firmware of a system board.

The first method of exchanging a system board is to design a new board to necessarily exchange the entire hardware, and require a larger number of steps than the second method of loading new firmware in designing and loading processes. Normally, When a board is exchanged or new firmware is loaded after a computer system is implemented and then modified, loading new firmware requires a shorter processing time.

In a computer system having a plurality of partitions in which a plurality of operating systems can be simultaneously operated, different versions of firmware can be used in the respective partitions. If a different version of firmware is used in each partition, it is necessary that the same version is to be used between the firmware of the replacing system board and the firmware of the partition to be used. Conventionally, in this case, the version of the firmware of each partition is checked by a person who exchanges a system board to use the same version.

Furthermore, when a partition is newly generated and a system board is expanded, it is desired that the firmware to be implemented in the system board is the latest version. However, it is not necessarily the latest version of firmware implemented in the current system board.

Patent Document 1 describes the method of efficiently performing a rewriting operation to update the version of firmware by determining whether or not the existing version and the latest version of the firmware for control of the output of information equipment match each other, updating the version to the latest version when they do not match, and selecting the latest version or the existing version and performing output processing depending on a result of the update.

Patent Document 2 describes the method of loading the optimum replacing firmware in the system configuration of the current peripheral device and the host computer from an automatically specified place when the driver is activated so that the firmware can be optimally updated.

[Patent Document 1] Japanese Published Patent Application No. 2002-358209

[Patent Document 2] Japanese Published Patent Application No. 2004-21463

SUMMARY OF THE INVENTION

The present invention aims at automatically updating the firmware to the optimum version when the system board is exchanged, etc.

The present invention is a firmware version managing method of a system board of a computer system having a plurality of partitions in which a plurality of operating systems can be operated and each partition is configured by one or more system boards, associates the version of the firmware being used in each partition with each partition and stores the association result in a partition-specific version storage unit, determines when the system board is exchanged whether or not the version of the firmware of the newly used system board matches the version of the firmware of the corresponding partition stored in the partition-specific version storage unit, and updates the firmware of the newly used system board to the same version as the firmware of the partition stored in the partition-specific version storage unit.

According to the present invention, when a system board is exchanged, the firmware of the system board can be automatically updated to the version of the firmware of the partition in which the system board is used.

In the above-mentioned firmware version managing method of the present invention, when the information about the partition assigned to each system board is stored in the system board configuration information storage unit, and the system board is exchanged, the information in the system board configuration information storage unit is referred and the partition of the system board to be exchanged is designated, the version of the firmware of the designated partition is obtained from the partition-specific version storage unit, and the firmware of the newly used system board is changed to the same version as the obtained firmware.

With the above-mentioned configuration, when a system board is exchanged, the partition assigned to the system board to be exchanged is designated according to the information stored in the system board configuration information storage unit to automatically update to the firmware of the version which is the same as the version of the firmware being used in the designated partition.

In the firmware version managing method according to the above-mentioned invention, when the board identification information for identification of the system board is stored in the system board configuration information storage unit, the firmware of the latest version is stored in the latest version storage unit, and the new partition is set and the new system board is used, the board identification information about the newly used system board is compared with the board identification information stored in the system board configuration information storage unit and it is determined whether or not the system board has not been registered. If the newly used system board has not been registered, then the firmware of the newly used system board is changed to the firmware of the latest version stored in the latest version storage unit.

With the above-mentioned configuration, when a new partition is set and a new system board is implemented, the firmware of the system board can be automatically updated to the firmware of the latest version.

In the firmware version managing method of the above-mentioned invention, the system board includes a first non-volatile memory storing the firmware of the version being used in the currently assigned partition, and a second non-volatile memory storing the firmware of the version used in the exchanged-to partition, and exchanges between the first and second non-volatile memory when the assigned-to partition of the system board is exchanged.

With the above-mentioned configuration, by exchanging the non-volatile memory loaded into the system board, the firmware of the version adapted to the exchanged-to partition can be quickly adopted.

In the above-mentioned firmware version managing method of the present invention, if an abnormal operation occurs as a result of updating the version of the firmware of the system board of the specific partition, then the version of the firmware of the system board of the specific partition in which the abnormal operation occurs is returned to the old version of the firmware of the specific partition stored in the partition-specific version storage unit with each partition kept in the active state.

With the above-mentioned configuration, if an abnormal operation occurs as a result of changing the version of the firmware, then the version before the change can be recovered to the original state.

In the firmware version managing method according to the above-mentioned invention, when the firmware of a plurality of versions is stored in the backup storage unit, and the system board is exchanged, the version of the firmware of the newly used system board is compared with the version of the firmware of the corresponding partition stored in the partition-specific version storage unit. If the versions do not match each other, the version of the firmware of the partition is obtained from the partition-specific version storage unit, the firmware of the version is read from the backup storage unit, and the firmware of the newly used system board is changed to the firmware of the version read from the backup storage unit.

With the above-mentioned configuration, if a system board is exchanged and the version of the firmware of the newly used system board is different from the version of the firmware of the partition assigned to the system board, then the update can be performed to the optimum version using the firmware stored in the backup storage unit.

BRIEF DESCRIPTION OF THE DRAWINGS

FIG. 1 shows the basic configuration of a computer system;

FIG. 3A shows partition-specific respective version number information;

FIG. 3B shows system board configuration information;

FIG. 3C shows the configuration of OBP backup information;

FIG. 5 is an explanatory view showing the automated update process when a system board is exchanged;

DESCRIPTION OF THE PREFERRED EMBODIMENTS

Figure 2:
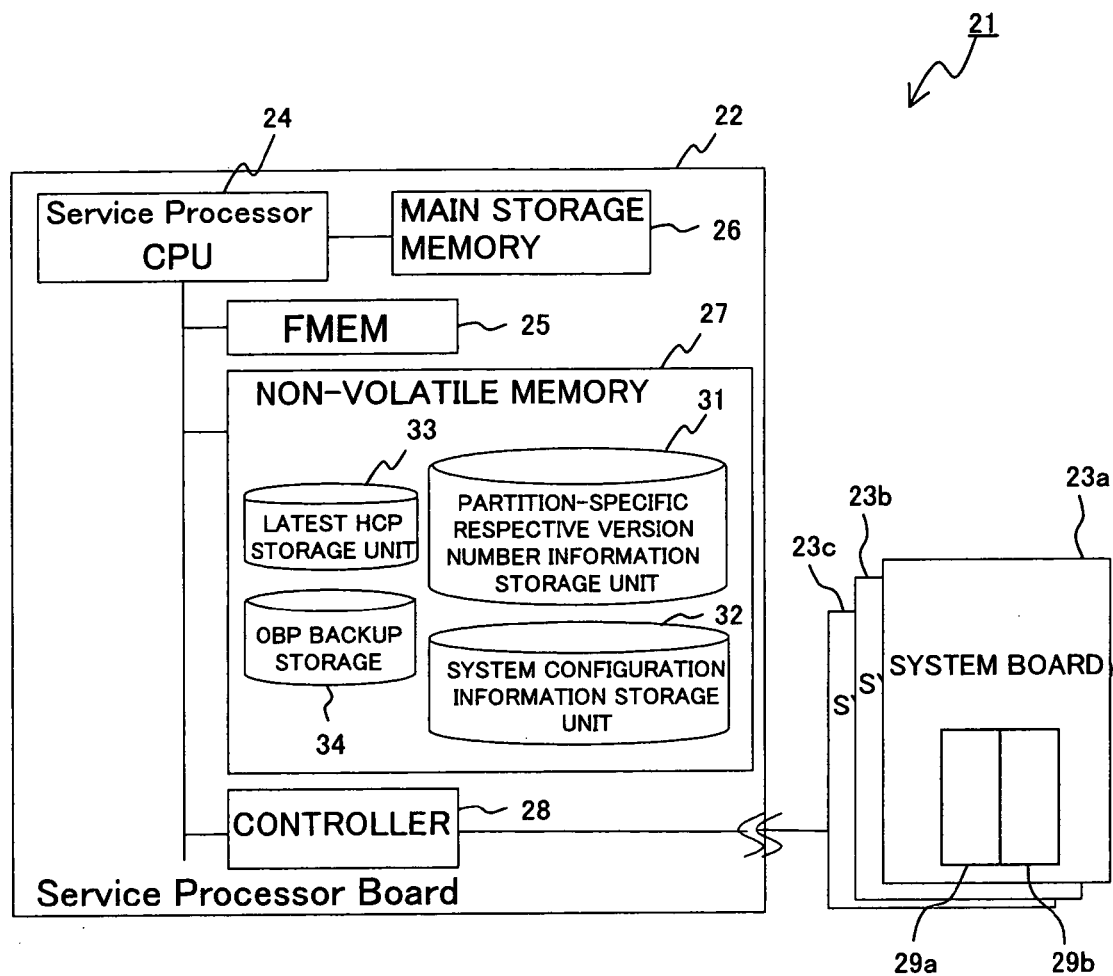
FIG. 2 shows the configuration of the computer according to an embodiment of the present invention.

The embodiments of the present invention are described below by referring to the attached drawings. FIG. 1 shows the basic configuration of a computer system 11 relating to the present invention.

The computer system 11 has a plurality of partitions in which a plurality of operating systems can be simultaneously operated, and each partition is configured by one or more system boards 16a~16n in which firmware is implemented.

The computer system 11 shown in FIG. 1 comprises: a partition-specific version storage unit 12 for storing each partition as associated with the versions of the firmware of the system boards 16a~16n assigned to each partition; a system board configuration information storage unit 13 for storing a partition assigned to a system board associated with the board identification information for identification a system board; and a latest version storage unit 14 for storing firmware of the latest version.

It further comprises a version change unit 15 for updating the version of the firmware of the system boards 16a~16n. When a system board is exchanged, the version change unit 15 compares the version of the firmware implemented in a newly used system board with the version of the firmware of the corresponding partition stored in the partition-specific version storage unit 12. If they do not match, the firmware of the newly used system board is changed to the same version as the firmware of the corresponding partition stored in the partition-specific version storage unit 12.

When a new partition is set, the version change unit 15 compares the board identification information about the newly used system board with the board identification information stored in the system board configuration information storage unit 13, and determines whether or not the system board has not been registered. If it has not been registered, the firmware of the newly used system board is updated to the latest version.

FIG. 2 shows the configuration of the central portion of a computer 21 (information processing device) according to an embodiment of the present invention. The computer 21 has a plurality of partitions in which a plurality of operating systems can be simultaneously operated.

The computer 21 comprises a service processor board 22, and one or more system boards 23a, 23b, 23c, • configuring a plurality of partitions. The system boards 23a, 23b, 23c, . . . are loaded with a CPU, memory, a controller, etc.

The service processor board 22 comprises a service processor (CPU) 24; rewritable non-volatile memory (FMEM) 25 comprising flash memory, etc. for storing a control program executed by the service processor 24; main storage memory 26; rewritable non-volatile memory 27 which comprises a disk device or flash memory, etc. and stores management information about the system boards 23a, 23b, 23c, . . . ; and a controller 28 for controlling the communication of data with the system boards 23a, 23b, 23c, . . . .

In the following explanation, a system board 23 refers to all the system boards 23a, 23b, 23c . . . or a specific system board.

The system board 23 is loaded with two rewritable non-volatile memory (FRAM) 29a and 29b such as flash memory, etc. The two non-volatile memory (FRAM) 29a and 29b store an initialization program (open boot program (OBP)) of the same or different versions. The initialization program (OBP, firmware) performs a diagnosis on a system board, initialization, download of an OS from the disk device not shown in the attached drawings, etc.

Thus, by having two non-volatile memory 29a and 29b, for example, when a partition to which a system board is assigned is exchanged, the initialization program of the version being used in the currently assigned partition is stored in the non-volatile memory 29a, and the initialization program of the version used in the exchanged-to partition is stored in the other non-volatile memory 29b. By switching between the non-volatile memory 29a and 29b, a quick exchange can be made to the version of the initialization program being used in the exchanged-to partition.

The non-volatile memory 27 of the service processor board 22 is configured by a partition-specific respective version number information storage unit 31, a system configuration information storage unit 32, a latest HCP (hardware control program) storage unit 33, and an initialization program (OBP) backup storage unit 34.

The partition-specific respective version number information storage unit 31 stores the information about the version (version number) of the initialization program used in each partition as associated with the partition number.

FIG. 3A shows the configuration of a partition-specific respective version number information 41 stored in the partition-specific respective version number information storage unit 31.

As shown in FIG. 3A, the partition-specific respective version number information 41 is configured by a set of data including: a partition number; a current version number of the initialization program of the system board 23 assigned to each partition; a bank-specific version number of an initialization program stored in the two non-volatile memory 29a and 29b of the system board 23; a current bank number indicating a bank 0 or 1 of the currently used bank; and the previous version number in the initialization program stored in the two banks.

By referring to the partition-specific respective version number information 41, for example, the version of the current initialization program of the partition of the partition number of 0 is A, the two banks of the system board 23 assigned to the partition store the initialization program of the same version A, and the currently used bank is the bank 1, and no previous version number is stored. Additionally, the version of the current initialization program of the partition of the partition number of 1 is A, the bank 0 (for example, corresponding to the non-volatile memory 29a) stores the initialization program of the version A, the bank 1 (for example, corresponding to the non-volatile memory 29b) stores the initialization program of the version B, the currently used bank is the bank 1, and the version A is the previous version.

FIG. 3B shows the configuration of system board configuration information 42 stored in the system configuration information storage unit 32.

As shown in FIG. 3B, the system board configuration information 42 is configured by a set of data including: a system board number (SB number) designated depending on the position into which the system board 23 is inserted; a partition number assigned to each system board 23; and a board serial number (board identification information) uniquely assigned to each system board 23.

By referring to the board serial number of the system board configuration information 42, for example, it is determined whether or not the system board 23 inserted into the position of a specific system board number is a new system board 23.

The latest hardware control program (HCP) storage unit 33 stores the initialization program of the latest version, the latest firmware of the service processor board 22, etc.

The initialization program (OBP) backup storage unit 34 stores several generations of initialization programs for backup.

FIG. 3C shows the configuration of an OBP backup information 43 stored in the OBP backup storage unit 34.

As shown in FIG. 3C, the OBP backup information 43 is configured as a set of data including: version number information indicating the version of an initialization program; "valid" indicating whether or not the initialization program can be rewritten; and an initialization program (firm information). In FIG. 3C, 'x' indicates data can be rewritten, and 'o' indicates data cannot rewritten.

By reading an initialization program of a specific version of the OBP backup information 43 and writing the read initialization program to the non-volatile memory 29a or 29b of the system board 23, the initialization program implemented in the system board 23 can be rewritten into a desired version. The initialization program of the version number not to be stored anymore is set the validity as "invalid", thereby allowing the area to be overwritten when the storage capacity of the initialization program (OBP) backup storage unit 34 becomes short.

Next, the processing operation of the computer 21 with the above-mentioned configuration is explained below by referring to the flowchart shown in FIGS. 4, 6, 7, and 9. The process described below is performed by the service processor 24 of the service processor board 22.

Figure 4:
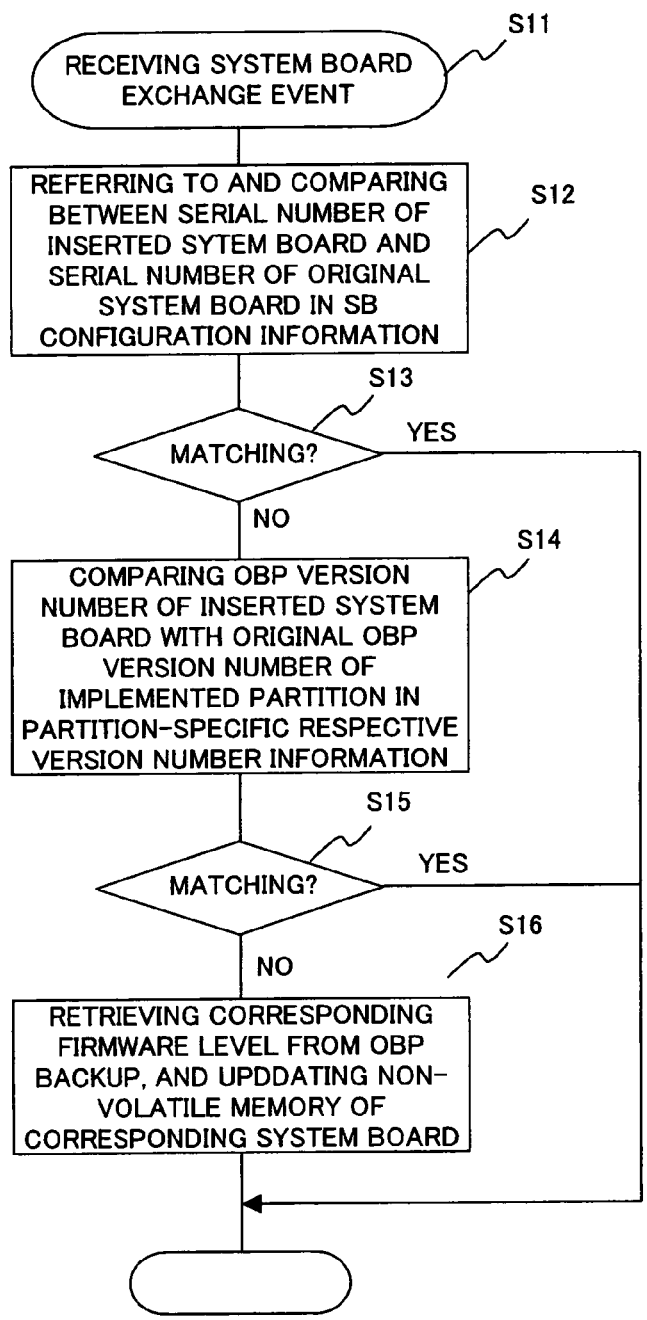
FIG. 4 is a flowchart of an automated update process on the version number when a system board is exchanged.

First, the process of automatically updating the initialization program implemented in the system board 23 to the optimum version when the system board 23 is exchanged is explained below by referring to the flowchart shorn in FIG. 4.

When the insertion of the system board 23 is detected and a system board exchanging event is received (S11 in FIG. 4), control is passed to step S12, and the following process is performed.

The system board number (for example, corresponding to the insertion position of the system board 23) is recognized from the position of the inserted system board 23, the system board configuration information 42 is referred to, and the board serial number corresponding to the system board number is obtained. Since the board serial number points to the board serial number of the system board 23 before the exchange, the serial number is compared with the input serial number of the system board 23.

In the next step S13, it is determined whether or not the serial numbers match. If the serial numbers do not match (NO in S13), control is passed to step S14, the system board configuration information 42 is referred to, and the partition number corresponding to the system board number is obtained. Then, the version number (version) of the initialization program corresponding to the partition number obtained by referring to the partition-specific respective version number information 41 is obtained.

In the next step S15, it is determined whether or not the version number of the initialization program implemented in the inserted system board 23 matches the version number of the initialization program being used in the corresponding partition.

When the version numbers do not match (NO in S15), control is passed to step S16, the initialization program of the same version number as the initialization program being used in the corresponding partition is retrieved from the initialization program (OBP) backup storage unit 34, and the initialization program of the version number obtained in the retrieval is written to the non-volatile memory 29a or 29b of the newly inserted system board 23, thereby updating the initialization program.

By the above-mentioned process in steps S11 through S16, when the system board 23 is exchanged, the version number of the initialization program of the newly inserted system board 23 can be automatically updated such that the version number can match the version number of the initialization program of the partition assigned to the system board. Thus, the operation of matching the version numbers of the initialization program is not required when the system board 23 is exchanged. Additionally, the occurrence of a malfunction by the non-matching version numbers of the initialization program of the system board 23 in the same partition can be prevented.

The process of updating the initialization program of the system board 23 to the optimum version number is explained below by referring to FIG. 5.

When the exchange of a specific system board 23 is detected, the partition number of the system board 23 is obtained from the system board configuration information 42. If it is found that the partition number is, for example, a partition number #0, then the version number of the initialization program (OBP) of the partition number #0 is obtained by referring to the partition-specific respective version number information 41 of the partition-specific respective version number information storage unit 31. If the version number of the initialization program is obtained, then the initialization program of the corresponding version number is downloaded from the initialization program (OBP) backup storage unit 34 (OBP of the version 1 in FIG. 5). Then, the initialization program of the version 1 downloaded to the non-volatile memory 29a or 29b of the system board 23 to be exchanged is written.

Thus, the version number of the initialization program of the system board 23 to be exchanged can be automatically updated such that it matches the version number of the initialization program being used in the partition to which the system board 23 is assigned.

Figure 6:
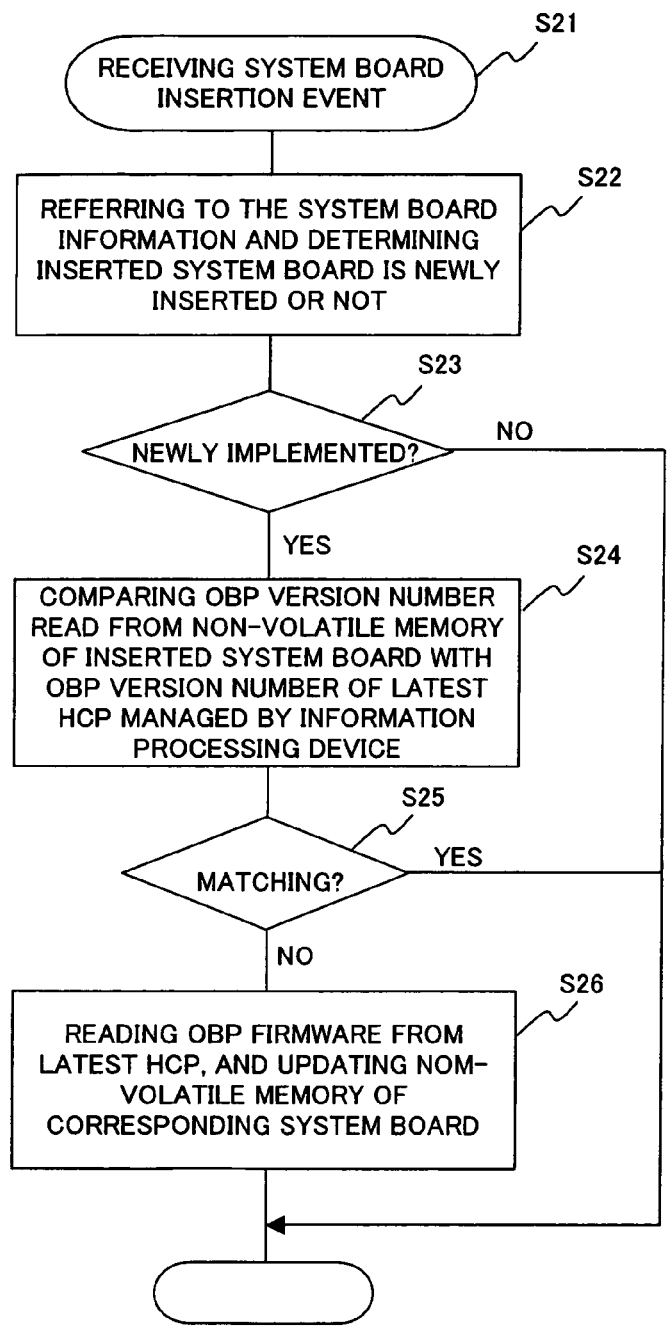
FIG. 6 is a flowchart of the automated update process on the version number of the system board of a new partition.

FIG. 6 is a flowchart of the automated update process of the initialization program when a new partition is generated, and the system board 23 used in the new partition is expanded.

When a system board 23 insertion event indicating that the system board 23 has been inserted is received (S21 shown in FIG. 6), the board serial number of the inverted system board 23 is compared with the board serial number of the system board number of the system board configuration information 42 (S22).

It is determined whether or not the inserted system board is a new system board depending on whether or not the board serial numbers match (S23).

If a new system board 23 is inserted (YES in S23), then control is passed to step S24, the version number of the initialization program (OBP) stored in the non-volatile memory (EMEM) 29a or 29b of the inserted system board 23 is read, and the version number of the initialization program is compared with the latest version of the initialization program stored in the latest HCP storage unit 33. Then, in the next step S25, it is determined whether or not the version numbers match.

If the version number of the initialization program of the newly inserted system board 23 does not match the latest version number (NO in S25), then control is passed to step S26, the initialization program of the latest version stored in the latest HCP storage unit 33 is read, and the initialization program of the latest version is written to the non-volatile memory 29a or 29b of the system board 23, thereby updating the initialization program.

If it is determined in step S23 that it is not the newly inserted system board 23 (No in S23), or if it is determined in step S25 that the version number of the initialization program of the newly inserted system board 23 matches the version number of the latest version (YES in S25), the process terminates immediately.

If a partition is newly generated by the process in steps S21 through S26, and a new system board 23 is inserted, then the new system board 23 can be automatically updated to the initialization program of the latest version number. Thus, when a partition is updated, the initialization program implemented in the system board 23 being used in the partition can be set to the latest version number.

Figure 7:
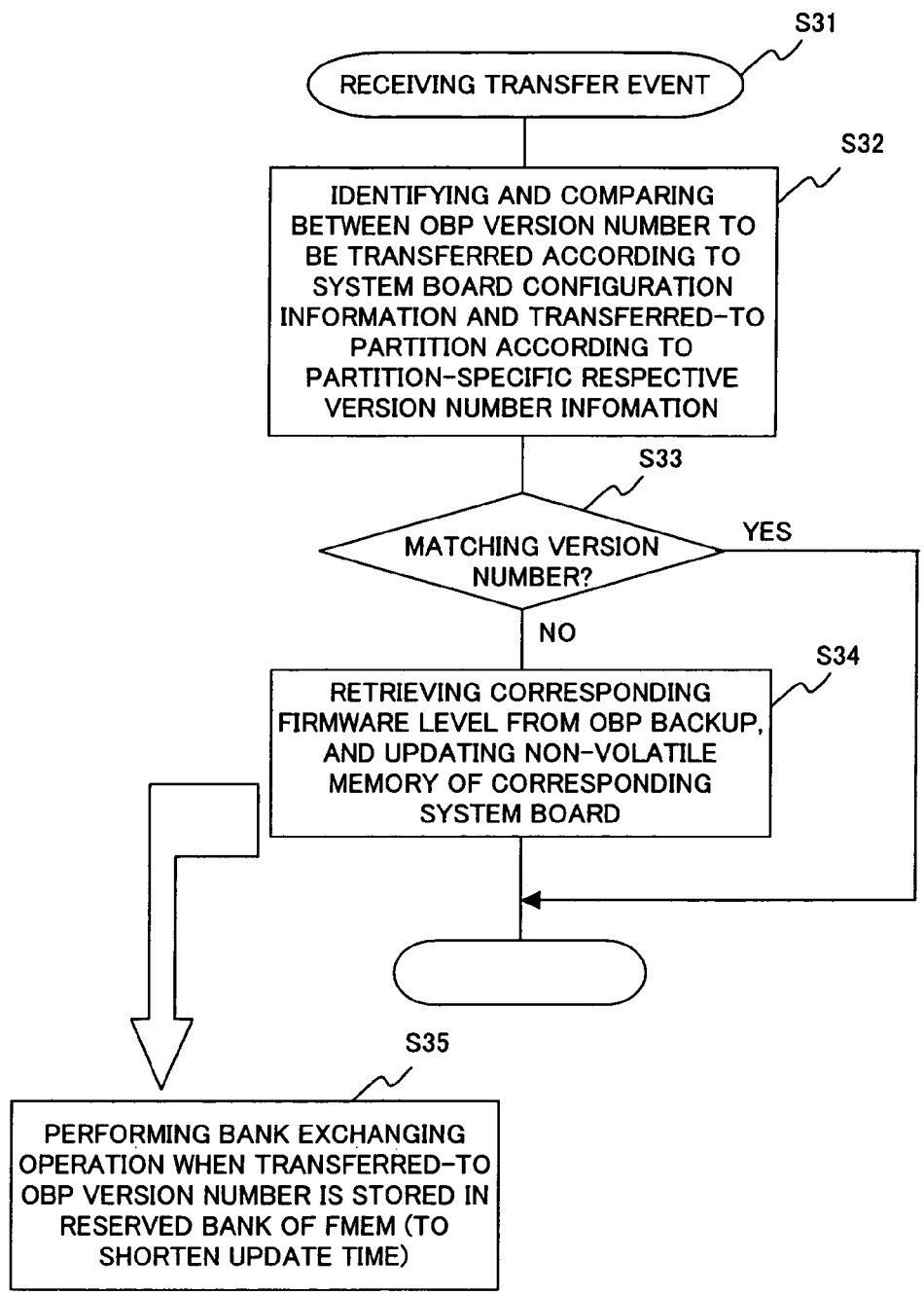
FIG. 7 is a flowchart of the automated update process when the configuration of a partition is changed.

FIG. 7 is a flowchart of the automated update process on the version number of the initialization program when a standby system board or the system board 23 assigned to a specific partition is dynamically exchanged to another partition in the active state.

When a transfer event of exchanging a partition of the system board 23 is received (S31 in FIG. 7), the version number of the initialization program of the system board 23 to be transferred is obtained by referring to the system board configuration information 42, and further by referring to the partition-specific respective version number information 41, the version number of the initialization program of the transferred-to (exchanged-to) partition is obtained to compare them (S32). In the next step S33, it is determined whether or not the version number of the initialization program of the system board 23 to be transferred matches the version number of the initialization program of the transferred-to partition.

Figure 8:
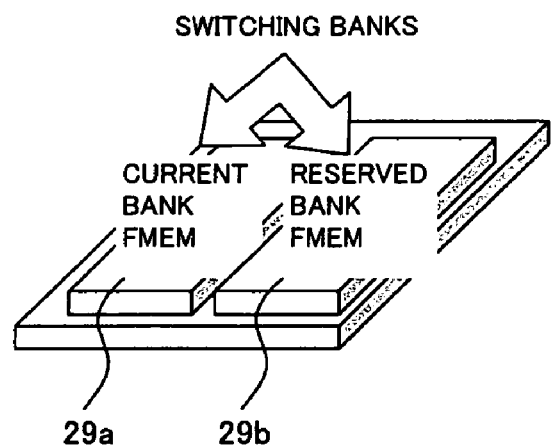
FIG. 8 is an explanatory view showing the exchange of a bank.

If the version numbers do not match (NO in S33), then control is passed to step S34, the initialization program having the same version number as the initialization program of the transferred-to partition is read from the OBP backup storage unit 34, and the initialization program is written to the non-volatile memory of the system board 23 to be transferred. According to the present embodiment, since the system board 23 is loaded with the two non-volatile memory 29a and 29b as the current bank and the reserved bank, as shown in FIG. 8, the initialization program of the version number of the transferred-to partition is written to the non-volatile memory 29b of the reserved bank.

If the initialization program of the same version number as the transferred-to partition has already been stored in the non-volatile memory 29b of the reserved bank, then the process in step S35, not in step S34, is performed. In the process in step S35, the program is exchanged to the initialization program stored in the reserved bank as a result of exchange in bank. Thus, when the partition assigned to the system board 23 is exchanged, the necessity to download the initialization program of the same version number as the exchanged-to partition, and write it to the non-volatile memory 29a (or 29b) on the system board 23 is eliminated, thereby shortening the time required to exchange the partition.

Figure 9:
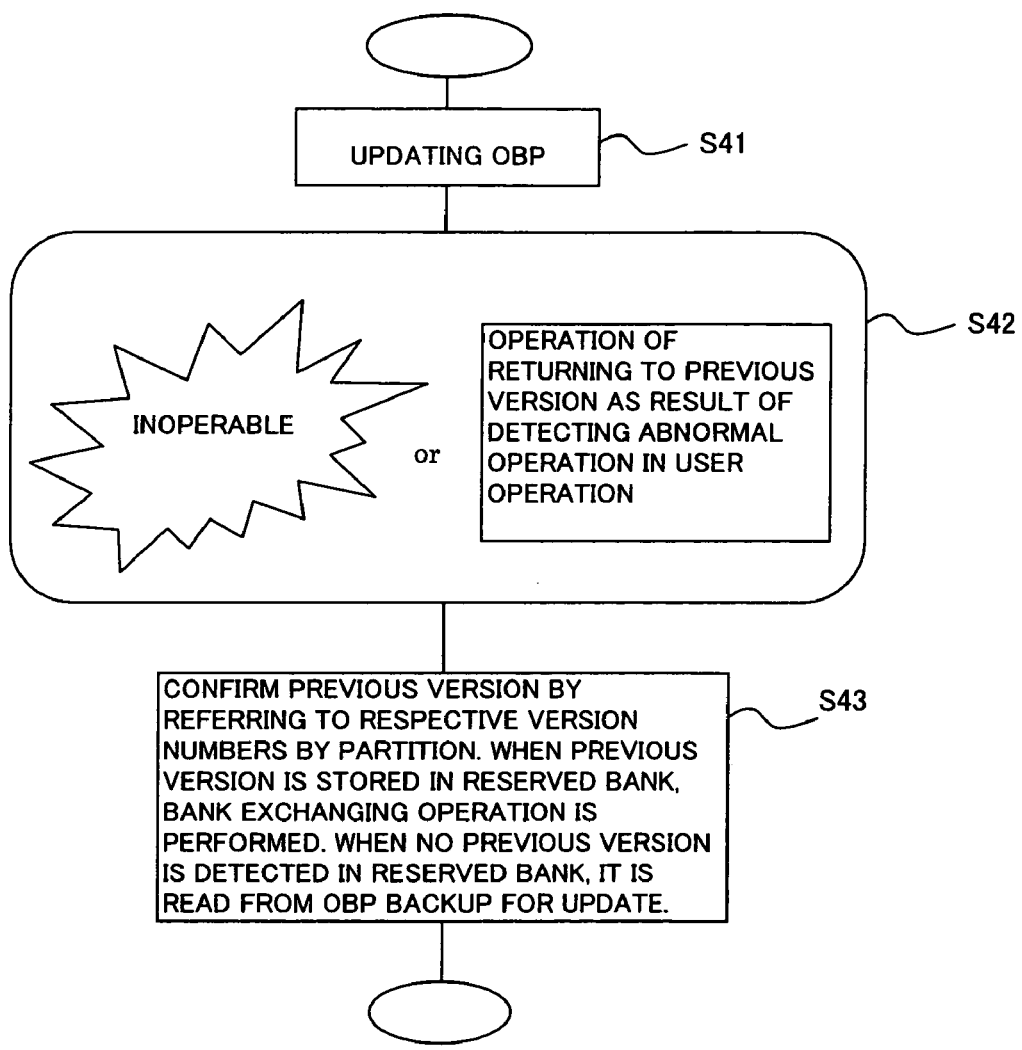
FIG. 9 is a flowchart of the process of returning to an old version.

FIG. 9 is a flowchart of the process of returning to the previous version when an abnormal operation occurs as a result of updating an initialization program.

If a system become inoperable or a user detects an abnormal operation as a result of updating the initialization program (OBP) of a specific partition (S41 in FIG. 9), the user performs an operation of returning the initialization program to the previous version (S42).

When the operation of returning the initialization program to the previous version is detected, the partition-specific respective version number information 41 is referred to in step S43, and the previous version number of the initialization program of the partition is obtained. If the previous version is stored in the reserved bank of the system board 23, the current bank is exchanged to the reserved bank to switch the version number of the initialization program. If the previous version is not stored in the reserved bank, the previous version is read from the OBP backup storage unit 34, and written to the reserved bank of the system board 23. Then, the bank is switched to the reserved bank.

If an abnormal condition occurs as a result of updating the initialization program of the system board of a specific partition in the processes in steps S41 through S43, the version number of the previous version of the partition is obtained from the partition-specific respective version number information 41, and the initialization program of the system board is rewritten to the initialization program of the previous version, thereby returning to the previous state.

The present invention can also be applied to other firmware, not limited to the initialization program.

In the present embodiment, the partition-specific respective version number information 41 and the system board configuration information 42 are stored as separate information, but they can be configured as a set of information.

According to the present invention, when a system board is exchanged, the firmware of the system board can be automatically updated to the version applicable to the partition in which the system board is used.

What is claimed is:

1. A firmware version managing method of a system board of a computer system having a plurality of partitions in which a plurality of operating systems can be operated, and each of the partitions is configured by one or more system boards, the method comprising:

storing a version of firmware used in each partition in association with the each partition in a partition-specific version storage unit;

determining, when the system board is exchanged, whether or not a version of the firmware of a newly used system board matches a version of the firmware of a corresponding partition stored in the partition-specific version storage unit;

changing, when the versions do not match, the firmware of the newly used system board to a same version as the firmware of the partition stored in the partition-specific version storage unit;

storing board identification information for identification of the system board in a system board configuration information storage unit; and storing firmware of a latest version in a latest version storage unit; wherein when a new partition is set and a new system board is used, board identification information about the newly used system board is compared with board identification information stored in the system board configuration information storage unit and it is determined whether or not the system board has not been registered, and when the newly used system board has not been registered, the firmware of the newly used system board is changed to the firmware of the latest version stored in the latest version storage unit.

2. The method according to claim 1, wherein:

the system board comprises first non-volatile memory storing the firmware of the version used in a currently assigned partition, and a second non-volatile memory storing the firmware of the version being used in an exchanged-to partition; and when an assigned-to partition of the system board is exchanged, the first and second non-volatile memory are switched to each other.

3. The method according to claim 1, wherein:

when an abnormal operation occurs as a result of updating the version of the firmware of the system board of the specific partition, the version of the firmware of the system board of the specific partition in which the abnormal operation has occurred is returned to a previous version of the firmware of the specific partition stored in the partition-specific version storage unit with each partition kept in an active state.

4. An information processing device having a plurality of partitions in which a plurality of operating systems can be operated, each of the partitions being configured by one or more system boards in which firmware is implemented, comprising:

a partition-specific version storage unit storing a version of firmware used in each partition in association with the each partition;

a version change unit determining, when the system board is exchanged, whether or not a version of the firmware of a newly used system board matches a version of the firmware of a corresponding partition stored in the partition-specific version storage unit, and changing, when the versions do not match, the firmware of the newly used system board to a same version as the firmware of the partition stored in the partition-specific version storage unit;

a system board configuration information storage unit storing board identification information for identification of the system board; and a latest version storage unit storing firmware of a latest version, wherein when a new partition is set and a new system board is used, the version change unit compares board identification information about the newly used system board with the board identification information stored in the system board configuration information storage unit, determines whether or not the system board has not been registered, and when the newly used system board has not been registered, changes the firmware of the newly used system board to the firmware of the latest version stored in the latest version storage unit.

5. The information processing device according to claim 4, wherein:

the system board comprises first non-volatile memory storing the firmware of the version used in a currently assigned partition, and a second non-volatile memory storing the firmware of the version being used in an exchanged-to partition; and when a partition assigned to the system board is exchanged, the first and second non-volatile memory are switched to each other.

6. The information processing device according to claim 4, wherein:

when an abnormal operation occurs as a result of updating the version of the firmware of the system board of the specific partition, the version change unit returns the version of the firmware of the system board of the specific partition in which the abnormal operation has occurred to a previous version of the firmware of the specific partition stored in the partition-specific version storage unit with each partition kept in an active state.

* * * * *